United States Patent
Galloway et al.

(10) Patent No.: US 8,430,986 B1
(45) Date of Patent: Apr. 30, 2013

(54) METHOD FOR MANUFACTURING A GOLF CLUB HEAD

(75) Inventors: J. Andrew Galloway, Escondido, CA (US); Donald Bridges, Escondido, CA (US)

(73) Assignee: Callaway Golf Company, Carlsbad, CA (US)

( * ) Notice: Subject to any disclaimer, the term of this patent is extended or adjusted under 35 U.S.C. 154(b) by 371 days.

(21) Appl. No.: 12/962,256

(22) Filed: Dec. 7, 2010

Related U.S. Application Data

(60) Provisional application No. 61/286,115, filed on Dec. 14, 2009.

(51) Int. Cl.
*B32B 37/00* (2006.01)
(52) U.S. Cl.
USPC .................. 156/245; 156/189; 156/191
(58) Field of Classification Search ............ 156/189, 156/191, 245
See application file for complete search history.

(56) References Cited

U.S. PATENT DOCUMENTS

| | | | |
|---|---|---|---|
| 4,575,447 A | 3/1986 | Hariguchi | |
| 4,581,190 A | 4/1986 | Nagamoto et al. | |
| 5,262,118 A * | 11/1993 | Fukushima et al. | 264/512 |
| 5,322,206 A * | 6/1994 | Harada et al. | 228/173.1 |
| 5,350,556 A * | 9/1994 | Abe et al. | 264/314 |
| 5,985,197 A * | 11/1999 | Nelson et al. | 264/314 |
| 6,010,411 A * | 1/2000 | Reyes | 473/345 |
| 6,607,623 B2 | 8/2003 | Murphy et al. | |
| 6,824,636 B2 | 11/2004 | Nelson et al. | |
| 7,582,248 B2 | 9/2009 | Reyes et al. | |
| 7,862,453 B2 * | 1/2011 | Kouno et al. | 473/345 |
| 2002/0190439 A1 * | 12/2002 | Nelson et al. | 264/512 |

* cited by examiner

*Primary Examiner* — Jeff Aftergut
(74) *Attorney, Agent, or Firm* — Michael A. Catania; Sonia Lari; Rebecca Hanovice

(57) ABSTRACT

The present invention relates to a method for manufacturing a golf club head. The method comprises using a bladder with an open face and a flange clamped over the open face during pressurization and molding. In a preferred embodiment, the bladder is composed of a material with a higher rigidity than latex.

7 Claims, 3 Drawing Sheets

METHOD FOR MANUFACTURING A GOLF CLUB HEAD

CROSS REFERENCES TO RELATED APPLICATIONS

The Present Application claims priority to U.S. Provisional Patent Application No. 61/286,115, filed on Dec. 14, 2009, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to the manufacture of golf club heads. Particularly to the manufacture of wood-type or driver-type heads.

2. Description of the Related Art

The prior art discloses various methods for manufacturing a composite golf club head. One such method is disclosed in U.S. Pat. No. 6,824,636 issued to Nelson et al., for Method of Manufacturing a Composite Golf Club Head. This patent discloses a method for manufacture of a hollow, complex three-dimensional fiber golf club head having at least one hole, which comprises a fluid-removeable core shaped in the general form of a golf club head, which is placed in a flexible, pressurizable bladder around a core.

Another example is U.S. Pat. No. 4,581,190 issued to Nagamoto et al. which discloses a process for making a golf club head where a fibrous bag of reinforcing fiber is placed over a rigid molding core. Yet another example is U.S. Pat. No. 4,575,447 to Hariguchi for Method for Producing a Wood Type Golf Club Head. This patent comprises the use of a thermoplastic synthetic resin core instead of the conventional rubber air bag for stable and reliable shaping.

A method currently in use for the manufacture of multiple material golf club heads involves using dip molded latex bladders to mold composite bodies. The bladder is dip molded on a shape softened mandrel. The bladder comprises a tubular neck for introducing pressuring gas, preferably nitrogen. The need to stretch to remove them from the convex mandrel requires a smooth contour. The process of molding comprises feeding the neck through a plate attached to each mold for each cycle. The bladder can be used approximately 2-3 times before failing during the cure cycle, due to leaks.

There presently exists a need for a bladder with more definition, which may be easily installed and maintains durability due to better fit.

The purpose of this invention is to create a method which comprises a barrier being paced between the pressurized gas and the composite material being cured. The method of the present invention accomplishes this with more definition, increased durability and improved molding operations.

BRIEF SUMMARY OF THE INVENTION

The method of the present invention reduces definition due to the bladder's definition, relative rigidity, stretch and uniformity of stretch of a molded article. The primary construction of the bladder is created with a material that is more rigid than the conventional materials used, such as latex. The use of a more rigid material improves durability of the bladder and the definition of the components molded. Use of the neck-less version of the bladder eliminates complexity in the tool, press and operation used in the molding process. Latex can be used for the neck-less configuration, however the bladder must be clamped by a face plate on the tool, or have enough rigidity to hold its approximate location prior to pressurization.

The method of the present invention comprises a bladder that may be produced from various materials to address specific needs or goals. Unlike the dip-molded bladder, the bladder of the present invention comprises an open face. The bladder forms a seal through a broad flange that is clamped during pressurization and molding. The flange does not need to stretch the degree the bladders off a smooth mandrel or using a neck need to. The method of the present invention does not involve threading a neck tube through a port or using an associated face plate for each tool. Tool/part subassemblies are molded in multiple heat and pressure cycles. The bladder of the present invention is more durable. The bladder may be produced using silicone and/or other materials, including reinforced materials, to accomplish a more inert bladder and a better fit for better control of details.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
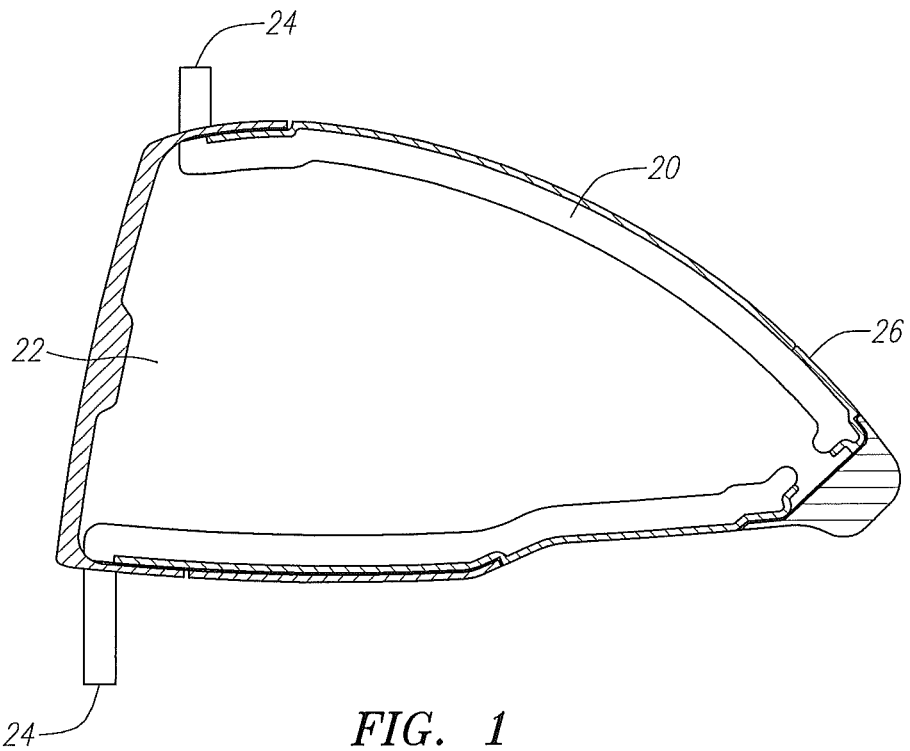
FIG. 1 is a perspective view of the method of the present invention in which the bladder does not have a neck.
Figure 2:
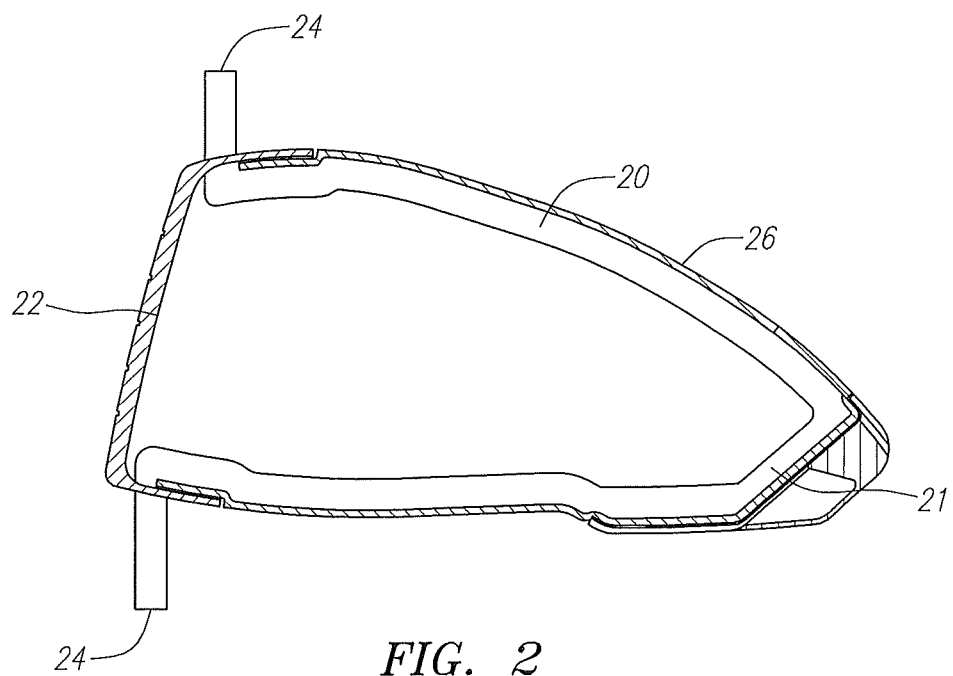
FIG. 2 is a perspective view of the method of the present invention.
Figure 3:
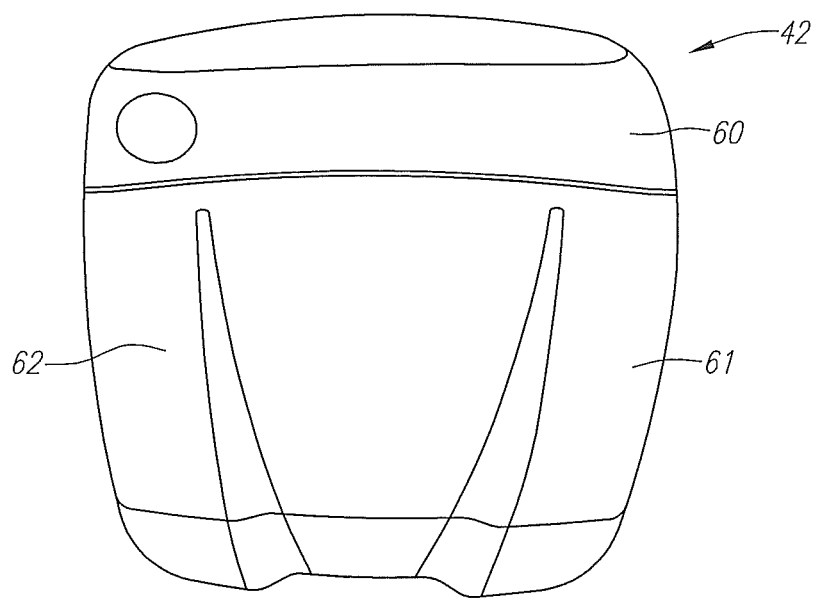
FIG. 3 is a top plan view of the golf club head of the present invention.
Figure 4:
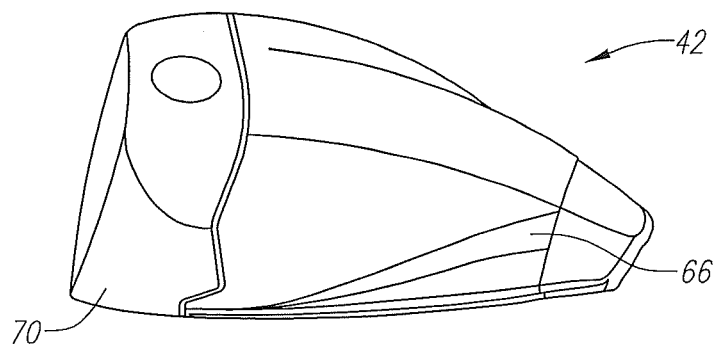
FIG. 4 is a heel view of the golf club head of the present invention.
Figure 5:
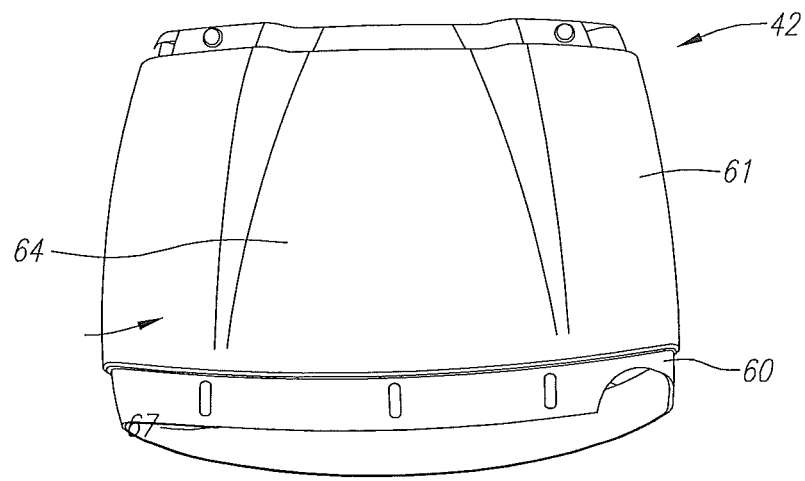
FIG. 5 is a bottom plan view of the golf club head of the present invention.
Figure 6:
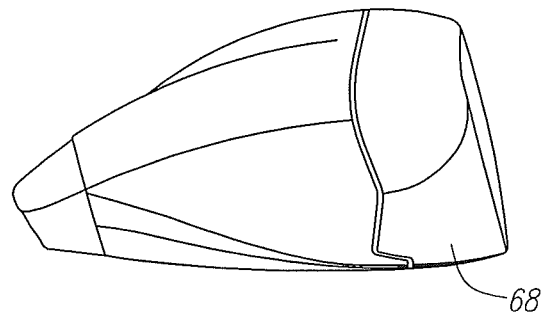
FIG. 6 is a toe view of the golf club head of the present invention.
Figure 7:
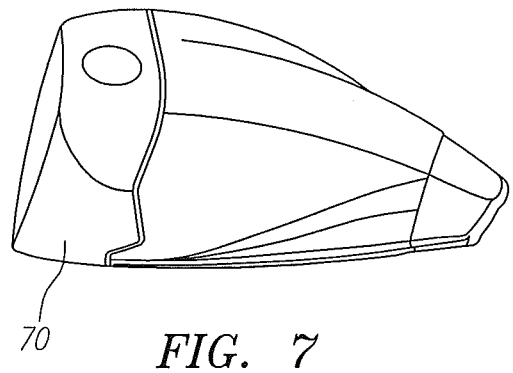
FIG. 7 is a heel view of the golf club head of the present invention.

As shown in FIGS. 1 and 2, the method of the present invention comprises wrapping resin impregnated reinforcing fiber around a bladder 20. The bladder 20 has an open face 22 and a flange 24 disposed over the open face 22. In a preferred embodiment, the bladder 20 further comprises a neck 21. The flange 24 is preferably clamped during pressurization and molding. The bladder 20 is placed inside a mold 26 having a shape of a desired golf club head 42, such as a driver. Once in the mold 26, the bladder 20 is pressurized. The mold 26 is heated to cure the resin. The bladder 20 is then removed from the mold 26.

In a preferred embodiment the bladder 20 is composed of a material that has a higher rigidity than latex. As shown in FIG. 2, in an alternative embodiment, the bladder 20 does not include a neck 21. In such alternative embodiment, the bladder 20 may be composed of latex. The bladder 20 may be composed of silicone or other materials, including reinforced materials.

As shown in FIGS. 3-7, a golf club head of the present invention is generally designated 42. In a preferred embodiment, the club head 42 is generally composed of a face component 60 and an aft-body component 61. The aft body component 61 preferably has a crown section 62 and a sole section 64 and may include a ribbon section 66. The body further comprises a toe side 68 and a heel side 70.

The golf club head 42, when designed as a driver, preferably has a volume from 200 cubic centimeters to 600 cubic centimeters, more preferably from 300 cubic centimeters to 500 cubic centimeters, and most preferably from 420 cubic centimeters to 470 cubic centimeters, with a most preferred volume of 460 cubic centimeters. The volume of the golf club head 42 will also vary between fairway woods (preferably ranging from 3-woods to eleven woods) with smaller volumes than drivers.

The golf club head 42, when designed as a driver, preferably has a mass no more than 215 grams, and most preferably a mass of 180 to 215 grams. When the golf club head 42 is designed as a fairway wood, the golf club head preferably has a mass of 135 grams to 200 grams, and preferably from 140 grams to 165 grams.

In one method, an inflatable bladder positioned within the hollow interior formed by the precursor components of the golf club head is preferably inflated at a pressure ranging from 50-200 pounds per square inch ("PSP"), and most preferably at 150 PSI. During the co-curing, a source of pressurized gas (not shown) is attached by a gas line to the inflatable bladder, and the bladder is inflated within the hollow interior of the pre-form unit. The bladder engages the inside surface of the pre-firm unit, forcing the plies of pre-preg sheets against the inner wall of the tool assembly. The tool assembly is heated within the press at the predetermined temperature for the selected period of time, i.e., a time sufficient to allow proper curing of the resin within the pre-preg sheets. After depressurizing, the bladder is removed through the bladder port and the molded unfinished golf club head is removed from the tool assembly.

Additional information concerning the method of the present invention is found at Reyes et al., U.S. Pat. No. 7,582,248 for an Apparatus And Method For Manufacturing A Multiple Material Golf Club Head, and Murphy et al., U.S. Pat. No. 6,607,623 for a Method Of Manufacturing A Composite Golf Club Head, both of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for manufacture of a wood-type golf club head, the method comprising:
    wrapping a resin impregnated reinforcing fiber around a bladder, the bladder having an open face and a flange disposed over the open face;
    clamping the flange for pressurization and molding;
    placing the bladder inside a mold, the mold having a shape of a wood-type golf club head;
    pressurizing the bladder in the mold;
    heating the mold to cure the resin impregnated reinforcing fiber; and
    removing the wood-type golf club head from the mold.

2. The method according to claim 1 wherein the bladder is composed of a material that has a higher rigidity than latex.

3. The method according to claim 1 wherein the bladder does not include a neck.

4. The method according to claim 1 wherein the wood-type golf club head is a driver-type golf club head.

5. A method for manufacture of a wood-type golf club head, the method comprising:
    wrapping a resin impregnated reinforcing fiber around a neckless bladder, the neckless bladder having an open face and a flange disposed over the open face, the flange clamped;
    placing the neckless bladder inside a mold, the mold having a shape of a wood-type golf club head;
    forming a bladder/mold assembly;
    pressurizing the neckless bladder in the mold,
    heating the mold to cure the resin impregnated reinforcing fiber; and
    removing the wood-type golf club head from the mold.

6. The method according to claim 5 wherein the neckless bladder is comprised of a material with a higher rigidity than latex.

7. The method according to claim 1 wherein the wood-type golf club head is a driver-type golf club head.

* * * * *